Figure 1:
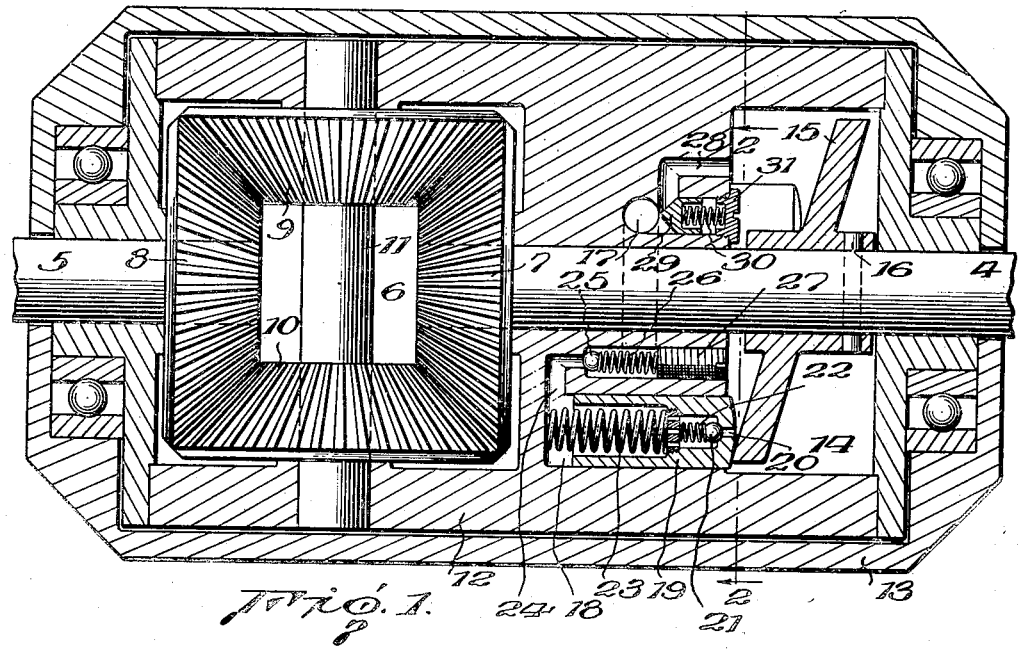

Sept. 18, 1934.	H. G. COLE	1,974,354
VARIABLE POWER MECHANISM
Filed Oct. 10, 1932

Inventor
Harry G. Cole,
By Dwight B. Gain.
Attorney

Patented Sept. 18, 1934

1,974,354

UNITED STATES PATENT OFFICE 1,974,354

VARIABLE POWER MECHANISM

Harry G. Cole, Washington, D. C.

Application October 10, 1932, Serial No. 637,129

5 Claims. (Cl. 74—34)

The invention relates to variable power mechanism and is applicable to any type of machine or automotive vehicle wherein it is required or desired that a power change be made either automatically or through manual control.

The primary object of the invention is to provide means of simple and economic construction and capable of being readily adapted to machinery now in use which will operate to change the power whenever the load varies.

A further object of the invention is to provide means in connection with drive and driven members whereby the drive ratio between the two may be automatically or manually varied in accordance with the load to which the driven member is or may be subjected.

The above and other objects which will appear as the description proceeds, are accomplished by means of the mechanism hereafter described in the specification, illustrated in the drawing, and particularly set forth in the claims.

In the drawing:—

Figures 2, 3:
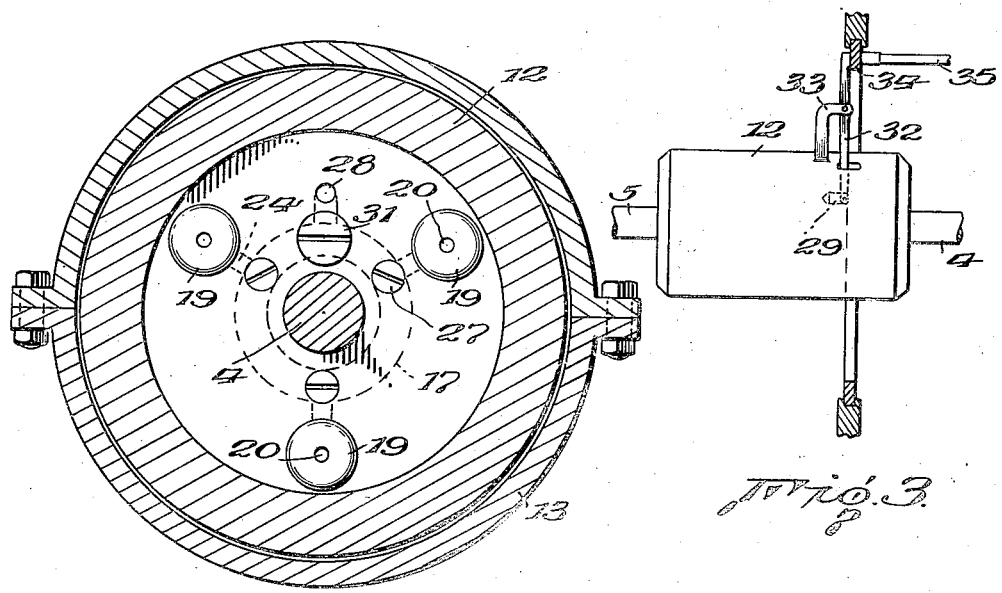

Fig. 1 is a longitudinal sectional view taken through a conventional form of power transmission mechanism and showing the same equipped with a variable power mechanism embodying the invention, Fig. 2 is a transverse sectional view taken substantially upon line 2—2 of Fig. 1, and Fig. 3 is a side elevation of the power unit, on a reduced scale, and illustrating the means whereby the power may be varied manually.

Referring now to the drawing, 4 and 5 indicate aligned shafts, having transmission mechanism indicated in its entirety at 6 connecting the same in the usual well known manner. This mechanism includes bevel gears 7 and 8 on adjacent ends of shafts 4 and 5 respectively, with which are associated planetary gears 9 and 10 carried by a planetary gear or stub shaft 11 supported by a member or element 12. The element 12 comprises a substantially cylindrical casing enclosing the shaft ends and rotatable independently thereof. This case 12 is suitably mounted upon roller bearings within the housing 13 which may be fixed. Any other supporting means for the case 12 may be employed if desired.

The case is provided with an interior annular chamber 14 which comprises a fluid reservoir, and within which a cam 15 pinned as at 16 to shaft 4 rotates. This cam comprises a pump operator for operating upon the fluid in the manner hereafter detailed.

The case 12 is provided with an annular fluid channel or passage 17 preferably concentric with shaft 4. This channel is in communication with pump chambers 18 in any desired number within the case and disposed preferably parallel with shaft 4. Each pump chamber is equipped with a piston 19 having in its outer end a port 20 to communicate with the reservoir 14. This port is normally closed by a valve such as the ball 21 by an expansion spring 22, while a comparatively heavy expansion spring 23 normally maintains the pump piston in outward position. The base of the pump cylinder 18 communicates with the passage 17 by means of a channel 24, and a valve such as the ball 25 is arranged in this channel to prevent back pressure. This valve is normally held seated by expansion spring 26, the tension of which may be regulated by adjustment of the screw plug 27.

The passage 17 is provided with a vent 28 which leads to the chamber or reservoir 14, and the venting of fluid from the passage to the reservoir is controlled by the valve 29. In instances where the variable power mechanism is to operate automatically, the time at which the venting will occur will be governed by the tension of spring 30 held against the valve by a cap screw 31, while in instances where the variable power mechanism is to be controlled either by a governor or manually, the said valve 29 will be connected with a mechanism such as is disclosed in Fig. 3, including an arm 32 extending through the case and pivoted intermediate its ends to a support 33 carried by and rotatable with the said case. The outer end of arm 32 abuts a ring or other operator 34 capable of movement longitudinally of the case either by a suitable governor mechanism or a lever connected with the operating rod 35.

The device as here described, for convenience merely is assumed to utilize shafts 4 and 5 as drive and driven shafts respectively, but it will be understood that this order may be reversed if desired, or the case 12 may be utilized as either the drive or the power take-off element. It is also contemplated that variations in the gear sizes and ratios from those shown may be resorted to when using the case as the power element or the power take-off. The transmission mechanism represented generally at 6 may also take forms other than that disclosed, as other gearing or power transmission may be resorted to within the scope of the invention. The variable power device within the case is here disclosed as embodying one form merely of the invention, and it will be understood that other mechanism for changing the power ratio may equally as well be employed.

In operation, upon the assumption that 4 is the power and 5 the power take-off shaft, and that the invention will assume the form as shown in Figs. 1 and 2, under normal conditions these shafts, as well as the case 12, will be locked together and will rotate as a unit. Should increased resistance be offered to the shaft 5, the mechanism will automatically operate to compensate for this variance. The increased resistance will act as a drag upon the transmission mechanism, whereupon the shaft 5 will travel at a speed slower than that of shaft 4. As the cam 15, keyed or pinned to the shaft 4, continues to turn, the pump pistons 19 operate to build up fluid pressure in the annular passage 17 until such pressure overcomes the tension of spring 30 on valve 29, whereupon the fluid is vented through vent 28 to the chamber or reservoir 14. This causes a decrease in the speed of rotation of case 12 tending to equalize its speed with the rotation of power shaft 4, whereupon increased speed will be reflected in the driven shaft 5. The tension of the spring 30, therefore, will determine the variation and resistance. Should a variation in speeds occur between the shafts 5 and 4, as for instance by decreasing the speed of the drive shaft 4, the valve 29 will immediately open, due to the increased pressure, and equalize as before. Should an offer of resistance be made to the case 12, the variation in speeds will also be compensated for by operation of the valve 29.

For manual or governor control of the power variation mechanism, it is obvious that manipulation of the rod 35 by a governor or from a hand lever will operate the valve 29 to open or close the vent and thus compensate for power variations as desired or determined by the speed of a governor.

Having thus described my invention, I claim:—

1. In a device of the class described, a pair of shafts, bevel gears on adjacent ends of said shafts, a stub shaft between said shaft ends and disposed at right angles thereto, intermediate gears on said stub shaft in mesh with said first named gears, a case carrying said stub shaft, said case having a chamber therein receiving one of said shafts, a passage in said case in communication with said chamber, pistons to supply fluid under pressure to said passage, a member in said chamber connected to the shaft therein for operating said pistons, and a valve to control the flow of fluid in said communication.

2. In a device of the class described, a pair of shafts, bevel gears on adjacent ends of said shafts, a stub shaft between said shaft ends and disposed at right angles thereto, intermediate gears on said stub shaft in mesh with said first named gears, a case carrying said stub shaft, and said case having a chamber therein to receive one of said shafts, a passage in said case in communication with said chamber, a pump in said case to force fluid from said chamber into said passage, a member in said chamber connected to the shaft therein for operating said pump, a valve to control the flow of fluid in said passage, and a spring normally holding said valve closed.

3. In a device of the class described, a pair of shafts, bevel gears on adjacent ends of said shafts, a stub shaft between said shaft ends and disposed at right angles thereto, intermediate gears on said stub shaft in mesh with said first named gears, a case carrying said stub shaft, and said case having an annular chamber, one of said shafts extending axially through said chamber, a passage in said case in communication with said chamber, a pump in said case to supply fluid under pressure to said passage, a cam on said shaft to operate said pump, and a valve to control the flow of fluid through said passage.

4. In a device of the character described, a driving shaft, a driven shaft, planetary transmission means connecting said shafts, a case so connected with said planetary transmission means as to be rotated thereby, said case having a fluid chamber through which one of said shafts is axially extended, said case having a fluid passage provided with a relief port communicating with said chamber, a piston arranged to reciprocate in a line parallel with the shafts and so constructed and arranged as to force fluid under pressure from said chamber into said passage, a rotatable cam also located in said chamber in a position to engage the outer end of said piston and a vent valve controlling outflow of fluid through said relief port.

5. In a device of the character described, a driving shaft and a driven shaft in axial alignment, a power transmission mechanism connecting said shafts, a case enclosing one of said shafts and so connected with said power transmission as to be rotatable about the axes of said shafts, said case having a fluid chamber through which one of the shafts is axially extended, said case also having a fluid passage provided with an outlet communicating with said chamber, pumps arranged in positions parallel with said shafts and extending into said chamber, said pumps having inlets communicating with said chamber and outlets communicating with said passage, a cam carried by the shaft which extends through said chamber and rotatable with said shaft, said cam being so positioned as to successively operate said pumps, and a valve controlling flow of fluid through said passage.

HARRY G. COLE.